United States Patent [19]

Baral et al.

[11] Patent Number: 4,932,042
[45] Date of Patent: Jun. 5, 1990

[54] SPONTANEOUS VOICE AND DATA MESSAGING

[75] Inventors: Elliott Baral, Chicago, Ill.; Percy B. Brown, East Brunswick; Reuben D. Hauptman, Marlboro, both of N.J.; Richard J. Jaeger, Jr., West Chicago, Ill.; Frank C. LaPorta, Millington, N.J.; Pamela J. Lauber, Middletown, N.J.; Richard E. LeCronier, New Monmouth, N.J.; Randall H. Nelson, Ocean, N.J.; Thomas L. Russell, Jr., Colts Neck, N.J.; Wen-Ping Ying, East Brunswick, N.J.

[73] Assignee: AT&T Bell Laboratories, Murray Hill, N.J.

[21] Appl. No.: 318,292

[22] Filed: Mar. 3, 1989

[51] Int. Cl.⁵ .................. H04M 3/50; H04M 7/06; H04M 11/00
[52] U.S. Cl. ............................. 379/67; 379/89; 379/94; 379/100; 379/230; 379/245
[58] Field of Search .............. 379/67, 88, 89, 214, 379/213, 211, 212, 210, 94, 230, 245, 100

[56] References Cited

U.S. PATENT DOCUMENTS

| | | | |
|---|---|---|---|
| 4,272,810 | 6/1981 | Gates et al. | 364/900 |
| 4,736,405 | 4/1988 | Akiyama | 379/89 |
| 4,766,604 | 8/1988 | Axberg | 379/67 |
| 4,792,968 | 12/1988 | Katz | 379/67 |
| 4,809,321 | 2/1989 | Morganstein et al. | 379/211 |
| 4,811,381 | 3/1989 | Woo et al. | 379/67 |
| 4,811,382 | 3/1989 | Sleevi | 379/67 |
| 4,823,374 | 4/1989 | Verlohr | 379/67 |
| 4,825,460 | 4/1989 | Carter et al. | 379/67 |

FOREIGN PATENT DOCUMENTS

| | | | |
|---|---|---|---|
| 0170269 | 10/1983 | Japan | 379/215 |
| 0090451 | 5/1984 | Japan | 379/89 |
| 0263963 | 10/1988 | Japan | 379/212 |

Primary Examiner—Thomas W. Brown
Attorney, Agent, or Firm—Werner Ulrich

[57] ABSTRACT

This invention relates to arrangements for providing a new spontaneous voice message service to any telephone customer at any telephone station when that customer encounters any destination that is busy or that does not answer. When a customer having a dual tone multifrequency (DTMF) station calls any destination that is busy or does not answer, the customer is invited, via an announcement identifying the new service, to record the caller's voice message. The announcement accompanies the returned busy tone or audible ring signal. The customer keys *867(=*VMS) and is then connected to a Voice Message Operations Center (VMOC) which prompts the customer to record the message. Advantageously, customers need not redial a VMOC number, their own number, and a destination number to reach a VMOC for storing the video message; the added convenience of this arrangement should stimulate substantial additional use of voice message service. The announcement, at very low cost, makes the customers aware of the service at the time they are most likely to use the service.

6 Claims, 3 Drawing Sheets

ACTIONS AT TOLL SWITCH

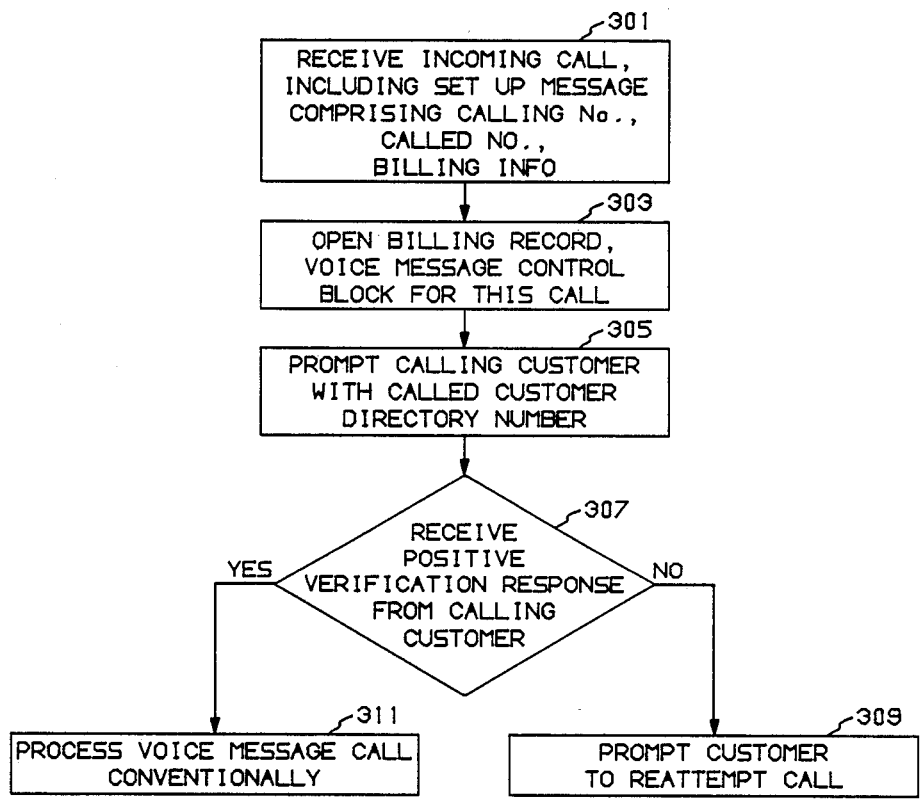

SPONTANEOUS VOICE AND DATA MESSAGING

TECHNICAL FIELD

This invention relates to messaging services for permitting telecommunications customers to record a message for later delivery.

PROBLEM

The telephone is the most common arrangement for implementing communications, especially voice communications, among people who are in separate locations. The telephone does require that the two parties who are conversing be available simultaneously. In order to overcome this difficulty, a number of voice messaging services have been proposed in the past. One such arrangement is the Voice Storage System described in the *Bell System Technical Journal*, May-June 1982, pages 811–914. One of the services offered by the Voice Storage System is Advanced Calling Service wherein a calling customer may leave a message for a called customer. The calling customer calls a special number to get access to a voice storage system and provides to that voice storage system the voice message, the telephone number of the called customer and an indication of when the voice message is to be delivered. This service has the disadvantage that a calling customer who has just placed a call and found that the called customer is either busy or does not answer and who wishes to leave a message must reinitiate a completely separate call. The customer must re-specify the called number and may have to re-specify billing information, such as a calling card number, in order to allow the voice storage service to have the information necessary for billing the call.

Marketing of services such as voice message service is expensive. Customers are informed of the availability of a service by mail, telephone solicitations, or media advertisements, all of which are costly.

Some of these disadvantages are overcome in accordance with the teachings of U.S. Pat. No. 4,766,604, which describes a coin telephone comprising a microprocessor. This coin telephone stores the identity of the coin station, the called number, and, if the customer has used a calling card, the number of the calling card. When the calling customer hears a busy tone or recognizes that the called customer does not answer, the calling customer can arrange to have a connection automatically set up to a voice storage system by keying an appropriate access code such as *6. The coin telephone then temporarily disconnects the calling customer, transmits the number of the voice storage system to a connected switching system and, after a connection has been established to the voice storage system, transmits the number of the coin station, the called customer number, and the calling card number. Thus, from the customer's point of view, a connection is automatically set up to a voice storage system as soon as the customer keys the access code. However, such an arrangement requires the use of an expensive telephone instrument and is therefore both expensive and difficult to deploy widely since telephone customers are not likely to purchase such an expensive instrument. Further, it requires that the telephone network accept a new origination, thus tying up telephone network resources.

Another arrangement which permits telephone customers to leave messages via message storage systems is exemplified by the Audix service offered on System 85 Private Branch Exchange (PBX) manufactured by AT&T Technologies. When a calling customer calls someone served by the PBX and that person is busy or does not answer, if that customer keys an appropriate signal, a voice message for the called customer may be recorded for later delivery. This service is limited to destinations of the PBX and does not serve the general public.

Accordingly, a problem of the prior art is that voice and data storage systems for serving the general public cannot be conveniently automatically accessed by customers after they receive a busy tone or don't answer indication. A further problem of the prior art is that it is expensive to inform customers of the availability of a service.

SOLUTION

The aforementioned problem is solved and a technical advance is achieved in the art by monitoring calls that enter a telephone network for a signal from the calling customer that voice or data messaging is requested; in response to such a signal, a connection is extended through the telephone network to a voice messaging operations center and the calling and called customers' identifications, which have been stored in a switching system at the entrance to the network, are signaled to the voice message operations center. Advantageously, a customer signals for spontaneous voice messaging service (SVMS) without redialing the called number and the connection is set up using the pre-existing connection between the customer and the network.

The problem of informing customers of the availability of a service is solved in one embodiment of the invention. A calling customer is informed of the availability of the service by an announcement provided at the same time or instead of audible ring or busy tone. Advantageously, such an arrangement reduces marketing costs to remind oustomers of the availability of this or another service.

In accordance with one embodiment of the invention, the network is a common carrier toll network and the switching system is a toll switch of that network connected via a local switching network to a calling customer. In this embodiment, when the toll switch receives the call it attaches a dual tone multifrequency (DTMF) receiver to the call pending reception of an answer in order to detect signals keyed by the calling customer. If an answer is received, then the call is set up in the conventional manner. In the meantime, the toll switch is monitoring for a signal representing the customer's request for spontaneous voice message service. For example, such a signal might be the keyed signals *867 (representing *VMS). When the toll switch detects the *867 signal, the toll switch sets up a connection from the toll switch to a voice message operations center (VMOC) and forwards the calling number, called number, and any billing information such as a calling card number, to the VMOC for subsequent processing of the voice message.

In accordance with one aspect of the invention, spontaneous voice message service is a service that is available only to customers who subscribe to the service. Advantageously, the monitoring function need only be performed for calls from customers who subscribe to the service, thus reducing the number of DTMF detectors required to serve calls.

In accordance with another aspect of the invention, the VMOC requests a verification of the destination directory number to ensure that a voice message is not delivered to the wrong customer if the calling customer originally misdialed. Since the caller requests VMS after receiving a busy tone or recognizing a don't answer condition, the caller has no indication of whether the correct number was dialed.

In accordance with another aspect of the invention, billing information such as an originating customer's directory number and/or a credit card (calling card) number is retained in an originating toll or operator assistance switch and is forwarded to the VMOC when a spontaneous VMS call is initiated. Advantageously, such an arrangement permits the charging for the VMS call to be controlled from the VMOC which has the information, necessary for properly charging the call, on whether or not the voice message is actually delivered. Even if a charge is made for an undelivered message, the charge for a delivered voice message may be higher.

BRIEF DESCRIPTION OF THE DRAWING

FIGS. 2 and 3 are flow diagrams of actions performed at a toll switch of the network and at a VMOC.

DETAILED DESCRIPTION

Figure 1:
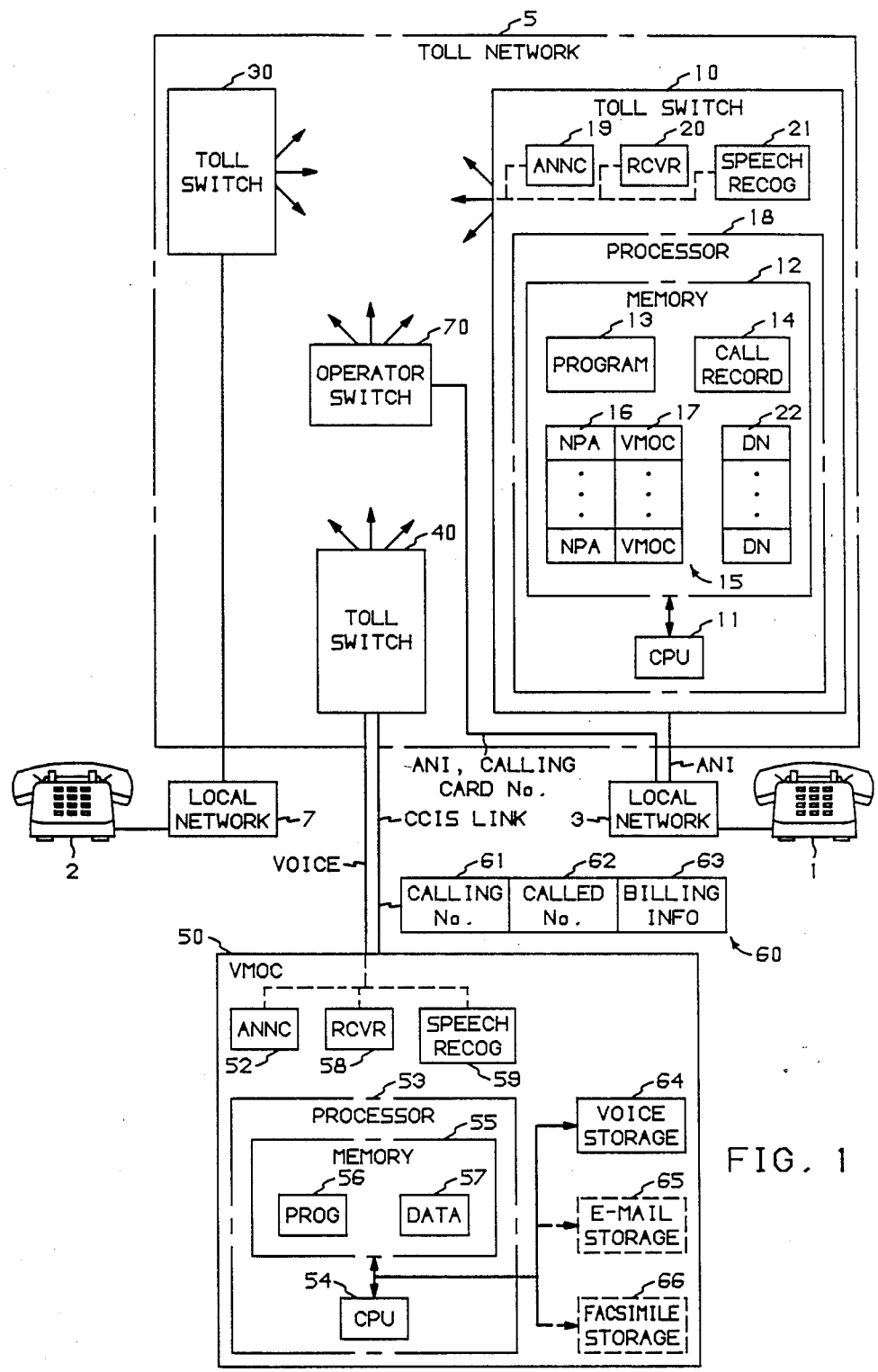
FIG. 1 is a block diagram of a network for providing SVMS.

FIG. 1 is a block diagram of an exemplary embodiment of the invention. A customer at calling telephone 1 with telephone directory number 201-949-7802 wishes to reach a called telephone 2 with telephone number 312-979-3255. The call is set up over local network 3 via toll network 5 to local network 7 for accessing called telephone 2. In toll network 5, the toll switch 10 is accessed from local network 3. The calling customer's number is forwarded from local network 3 via Automatic Number Identification (ANI) signals. Toll switch 10 sets up a connection over toll network 5 to local network 7 via toll switch 30. Called telephone 2 is then alerted. Assume that called telephone 2 is busy. The customer at calling telephone 1 hears the busy tone and keys the access code *867 to access spontaneous voice messaging service for this call. In response to receiving the *867, toll switch 10 disconnects the connection to toll switch 30 and instead initiates the establishment of a connection to toll switch 40 for accessing voice message operating center 50. Toll switch 10 sends a signaling message 60, over a common channel signaling (CCS) network (not shown) interconnecting toll switches 10 and 40, via toll swtich 40 to VMOC 50 comprising the calling number 201-949-7802 (segment 61), the called number 312-979-3255 (segment 62), and any other billing information that may have been received (segment 63). The VMOC announces the called number received in signaling message 60 to the calling customer in order to verify that a recorded message will be delivered to the proper destination. If the customer signals via a verification signal, such as a keyed DTMF 1, that the number is correct, then the VMOC prepares to receive and record the voice message in voice storage device 64. After the voice message has been completely received and recorded, the connection between the VMOC and calling telephone 1 is disconnected and the VMOC proceeds to attempt delivery of the voice message. The delivery of the message and the interaction with calling customers to receive further directions on when the call should be delivered and how many attempts should be made, are handled in the same way for spontaneous voice messaging as for a premeditated voice messaging service such as described, for example, on pp. 830–837 of the Voice Storage System reference.

Toll switch 10, which in the specific embodiment is a 4 ESS TM switch manufactured by AT&T Technologies and described in *The Bell System Technical Journal*, Vol. 56, No. 7, pages 1015–1320, September 1977, is program controlled. It includes a processor 18 comprising a central processing unit (CPU) 11, and a memory 12. The memory 12 includes a program 13 whose actions with respect to spontaneous voice messaging are described in FIG. 2. The memory also contains call records 14 for maintaining data associated with calls in the system, a translation table 15 to translate between the destination NPA code 16 (312 in this case), and a VMOC identity 17 (in this case VMOC 50).

Where the customer has specified the identity of a specific common carrier for serving that customer's SVMS calls, this translation table would be replicated for different carriers. For such situations, the memory 12 would also contain data specifying which customers have requested the use of which SVMS carriers.

Memory 12 also contains a table 22 of the directory numbers of those customers who have subscribed to SVMS service. In case the service is offered by a plurality of carriers, and in case each customer may pre-specify which carrier is to serve that customer's calls, this table will also contain an identification of the selected carrier. An alternate arrangement for selecting carrier is to have a different SVMS accessing code (*867 in this example) for each different carrier.

Toll switch 10 also comprises a plurality of DTMF receivers 20 for attachment to calls from customers so that their calls may be monitored for requests to set up an SVMS call.

If the call is an operator assistance call served by an operator switch 70, such as the Traffic Service Position System (TSPS) described in R. J. Jaeger, Jr. et al.: U.S. Pat. No. 3,484,560, then the operator switch will receive not only the ANI signals, but also may receive a calling card number for billing purposes. This number is retained and forwarded to VMOC 50 for preparing a subsequent voice message billing entry.

In accordance with one aspect of the invention, an announcement is returned to the calling customer from an announcement unit 19. This announcement would state: "If you wish to leave a message, please key *VMS" or some equivalent statement to notify the calling customer of the availability of the voice message service. This announcement is returned while the called customer is being alerted or at the same time as the calling customer receives a busy signal. The announcement may be made during silent intervals of the audible ring signal returned while the called customer is receiving an alerting signal, may be substituted for the audible ring, or may be superimposed onto a reduced amplitude audible ring; in any case, if an answer is detected, the announcement as well as the audible ring is removed and the connection between calling and called customers is established. For the case of a busy called customer, the announcement, perhaps suitably altered to reflect the busy condition, may be superimposed on the busy tone or substituted therefor. While in this embodiment of the invention, the announcement is tied to the offering of VMS service, the announcement could also be used to provide any other information to the calling customer during the ringing period or as an addition or substitute for busy tone. Further, while in this embodiment, a call is extended to a destination switching system prior to making a busy test, the announcement could also be provided without extending the call if the busy test were made in response to a common channel signaling (CCS) message, and the result reported in a return message; similarly, if alerting were performed in response to a CCS message, and answer reported in a CCS message, the announcement could also be provided without extending the call. Also, the announcement could be returned from a destination, originating, or intermediate switch instead of the toll switch 10.

While this description has shown an arrangement in which only customers who have presubscribed for the service will be offered SVMS, it is also possible to arrange a system wherein all customers may be offered SVMS. If that is done, then table 17 is not required except to specify different common carriers for customers who have specifically subscribed to the use of such different carriers. A disadvantage of making SVMS available to all customers is that the number of DTMF receivers required to monitor all calls is substantially increased. For operator assistance calls, SVMS can be made available to all customers, and can be initiated either upon detection of the keyed signal or when a signal is received from an operator.

While in this specific implementation, the service is restricted to customers having DTMF stations, it is also possible to use speech recognition units (21) or combined speech/DTMF recognition units in the toll switch to recognize requests from customers using a dial telephone. Further, if the request for voice message service is to be recognized at a local switch, then a temporary depression of the switch hook, known as a "flash" can be used by the customer to signal that request.

VMOC 50 is a program controlled system for recording messages and transmitting recorded messages to a destination. In order to handle SVMS, VMOC 50 requires special announcements in announcement unit 52. The VMOC is controlled by a processor 53, comprising CPU 54 and memory 55. The memory stores a program 56 which includes special program steps outlined in the flow charts of FIG. 3 for implementing SVMS. Memory 55 also stores data 57 such as the called number received in signaling message 60. DTMF detector 58 is included in VMOC 50 for detecting signals from the calling customer for controlling the SVMS call. In order to process calls from customers who do not have DTMF stations, a speech recognition unit 59 is also provided to recognize spoken commands to control the VMOC.

Electronic mail (E-Mail) or image data of different encoding schemes, such as facsimile, can also be treated in accordance with the principles of this invention. For example, the toll switch 10 can check not only for *867 (*VMS), but also for *667 (*MMS for E-Mail) and *367 (*FMS for Facsimile Message Service) and can route calls to specialized message service systems for forwarding electronic mail or facsimile data upon detecting one of these codes. Alternatively, a Message Operations Center (MOC) can be adapted to receive in addition to voice messages, E-Mail or facsimile input and to store the E-Mail or facsimile signals in blocks 65 or 66, respectively, for subsequent delivery to an E-Mail or facsimile destination.

Figure 2:
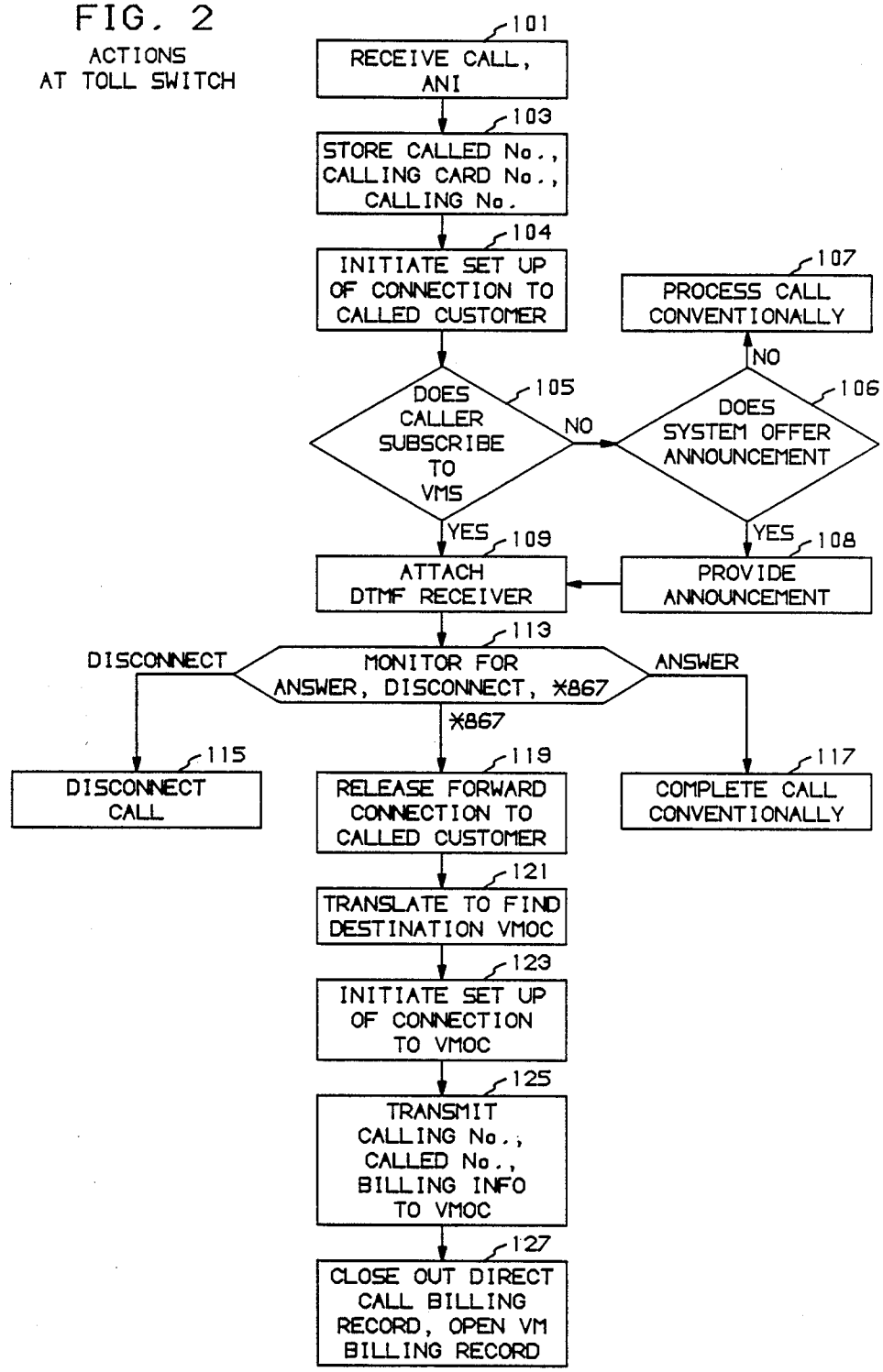

FIG. 2 illustrates the actions performed at toll switch 10. A customer dialed toll call, comprising a directory number of a called customer, is received along with the calling customer's directory number as forwarded by automatic number identification arrangements in the local network 2 (action block 101). The called number, the calling number and, if appropriate, a credit card (calling card) number of the call are stored in a call record 14 of toll switch 10 or operator switch 70 (action block 103). Toll switch 10 initiates the establishment of a connection to the called customer (action block 104). The toll switch determines whether the calling customer subscribes to SVMS by consulting table 17. If the calling customer does not subscribe to SVMS, test 106 determines whether the system provides an announcement to inform customers of and to offer the service. If the system provides an announcement, the announcement is provided (action block 108) and a DTMF receiver is attached to the call (action block 109). If the system does not provide the announcement and does not offer SVMS to all customers, the call is processed conventionally. If the calling customer does subscribe to SVMS, a DTMF receiver is attached to the call (action block 109). Thereafter, toll switch 10 monitors for three conditions: a called customer answer, a calling customer disconnect, or a dialed *867 from the calling customer as detected by a DTMF receiver (action block 113). If the disconnect is detected first, then the call is disconnected (action block 115). If an answer is detected then the call is completed conventionally (action block 117). If *867 is detected, then the connection from toll switch 10 to the called customer is released (action block 119) and table 16 is consulted to find the appropriate destination VMOC for serving this SVMS call (action block 121). In this specific embodiment, the destination VMOC would be a VMOC located close to the called customer in order to minimize the cost of delivery of the voice message. The toll switch 10 then initiates the establishment of a connection to that VMOC (action block 123) and transmits the calling number, called number and billing information to that VMOC (action block 125). The direct call billing record is then closed, because the call was not completed, and a voice message billing record is opened, to maintain a record for a VMS call (action block 127). The billing record for the VMS call can be used to generate a bill for the portion of the call required to access the VMOC and can be used as a marketing tool to study VMS use by different subscribers. Further actions are similar to those performed in processing a premeditated voice messaging call.

FIG. 3 is a flow diagram of the actions performed for an SVMS call in VMOC 50. These actions are performed under the control of program 56 in VMCO 50. VMOC 50 receives the incoming SVMS call including both a voice connection and a signaling setup message 60 comprising the calling number, called number and billing information (action block 301). VMOC then opens a billing record and a voice message control block for this call (action block 303). The announcement system 52 is connected to this call and an announcement comprising the called customer directory number is announced to the calling customer (action block 305). The prompting announcement also directs the calling customer to key an appropriate positive or negative verification response (such as 1 for yes, 2 for no) to verify whether the calling customer wishes to have a message delivered to that directory number. A DTMF detector 58 is attached to the call to detect signals from the calling customer. If the result of test 307, which analyzes the detected response, is that the customer has indicated that the number is incorrect, then the customer is prompted to re-attempt the call (action block 309). Otherwise, if the customer has indicated that the called number is correct, then the voice message call is processed conventionally (action block 311) in the same way as a premeditated voice message call.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. A telephone switching office comprising:
   means for detecting dual tone multifrequency (DTMF) signals; and
   processor means, operative under the control of a program stored therein, and responsive to reception of a call comprising an identification of a called station, for controlling the extension of said call to a destination switching office for serving said called station, and for connecting said means for detecting to said call to detect a voice message request signal comprising a DTMF signal, and further responsive to detecting said voice message request signal, for controlling the extension of said call to and for signaling said identification to a voice message operations center (VMOC) means for recording voice messages.

2. The switching office of claim 1 further comprising announcing means for announcing availability of voice message service, wherein said processor means is further operative under the control of said program for connecting said announcing means to said call in response to reception of said call.

3. The switching office of claim 1 wherein said processor means is further operative under the control of said program for requesting an identity of a a calling station of said call and, responsive to receiving said identity, for signaling said identity to said VMOC means.

4. Voice message operations center (VMOC) means for storing voice messages for any customer station served by a plurality of serving offices, comprising:
   storage means for storing voice messages;
   announcing means;
   processor means, operative under the control of a program stored therein, and responsive to reception of an incoming call, and to reception of an identity of a called one of said any stations served by one of said plurality of serving offices, received as a data message from a telephone switching office, for controlling storing a voice message in said storage means;
   said processor means further operative under the control of said program for controlling announcement of said called station identity to a calling station, for requesting a confirmation signal from said calling station, and for rejecting said voice message if no confirmation signal is received.

5. A method of establishing a voice message connection from a calling customer station to a voice message operations center (VMCO) means, comprising the steps of:
   extending a call, received in a first switching office from said calling station to a called station, to a destination switching office for serving said called station;
   signaling an identity of said called station received with said call in said first switching system from said first switching office to said VMOC means using a common channel signaling (CCS) message;
   announcing, to said calling station, a voice message indicating the availability of voice message service for storing a voice message for subsequent delivery to said called station;
   monitoring said calling station for a disconnect signal;
   monitoring said call for an answer signal from said destination switching office;
   monitoring said calling station to detect a dual tone multifrequency (DTMF) signal for requesting said service;
   in response to detecting an answer signal, discontinuing the step of monitoring for said DTMF signal;
   in response to detecting a disconnect signal, disconnecting said call and discontinuing the step of monitoring for said DTMF signal;
   responsive to detection of said DTMF signal, extending said call from said first switching office to said voice message operations center (VMOC) means for storing voice messages addressed to customer stations served by a plurality of serving offices;
   identifying said calling station;
   signaling an identity of said calling station from said first switching office to said VMOC means using a CCS message;
   recording a message from said calling station at said VMOC means;
   transmitting said voice message from said VMOC means to said called station, said called station being identified by said identity of said called station signaled from said first switching office to said VMOC means; and
   transmitting a confirmation message from said VMOC means to said calling station, said calling station being identified by said identity of said calling station signaled from said first switching office.

6. A call processing method for a common carrier network arrangement including message operations center (MOC) means for serving any called stations servable by said network wherein said MOC means comprises a plurality of means for storing different types of messages, comprising:
   responsive to reception in a switching office of a spontaneous message service request signal on a call, extending said call from said switching office to said MOC means for storage of a message; and
   transmitting to said MOC means the identification of said any called station of said call to identify a station to which said stored message is to be subsequently delivered;
   wherein said extending comprises; responsive to reception in a switching office of a spontaneous message request signal on a call, said signal for specifying one of a plurality of requests for different types of messages, extending said call to one of said plurality of means for storing a message of the type requested by said request signal.

* * * * *